Patented Aug. 17, 1937

2,090,595

UNITED STATES PATENT OFFICE 2,090,595

PROCESS OF PREPARING AMIDO DERIVATIVES

Ralph A. Jacobson, Wilmington, Del., assignor to E. I. du Pont de Nemours & Company, Wilmington, Del., a corporation of Delaware No Drawing. Application January 24, 1936, Serial No. 60,707

23 Claims. (Cl. 260—124)

This invention relates to long chain acyl amides and amines in which the acyl groups have, for example, a chain of from eight to eighteen carbon atoms inclusive, and to processes for their preparation. It relates more particularly to mixtures of such acylated amides or amines, derived from naturally occurring fats, oils and waxes, the acyl radicals of which correspond in character and proportions to those present in combined form in said naturally occurring bodies.

It is an object of the invention to provide a new and improved process for the synthesis of the above acylated amides and amines. Another object is the provision of a new and improved process for the synthesis, directly from fatty oils, of long chain acyl amides and amines. A more specific object is to produce new and useful mixtures of long chain acyl amides and amines in which the acyl groups are those present in combined form in naturally occurring oils, fats and waxes, for example, coconut oil, linseed oil and China-wood oil. Other objects will appear hereinafter.

These objects are accomplished in accordance with this invention by reacting a fatty oil with an alkali metal nitrogen compound selected from the class consisting of alkali metal amides and alkali metal amines. By an "alkali metal amide or amine" is meant a carboxylic acid amide or an organic amine in which at least one hydrogen atom directly attached to an amido or amino-nitrogen is replaced by an alkali metal. Carbonic acid is considered to be a carboxylic acid. The term "fatty oil", as used herein, is intended to apply to naturally occurring esters such as the animal and vegetable oils, fats and waxes. In general, the fatty oils are usually glycerides of fatty acids; for instance, the chief ingredient of coconut oil is the glyceride of lauric acid, in China-wood oil the chief ingredient is the glyceride of eleostearic acid, and in linseed oil the chief ingredient is the glyceride of linoleic acid.

In practicing the invention, it is preferable to carry out the reaction in one of two ways. If the pre-formed alkali metal amide or amine is employed, the reaction between the naturally occurring ester (i. e., the oil, fat or wax) and the alkali metal amide or amine is preferably effected in the presence of a catalyst such as, for example, acetone. On the other hand, if the alkali metal amide or amine is formed in situ (e. g. in liquid ammonia in the presence of the ester), good results have been obtained in some instances without a catalyst. The final product will depend largely upon the reacting ingredients, as hereinafter more fully described. In general, its true character is probably a mixture of acyl amides or amines, the acyl radicals of which are the different acyl radicals present in combined form in the original fat, oil or wax.

The invention is illustrated but not limited by the following examples in which, unless otherwise indicated, the quantities are stated in parts by weight.

EXAMPLE I

Acyl formamide from coconut oil

To a solution of 77 parts of coconut oil in about 44 parts of acetone were added at room temperature, with stirring, 16.5 parts of sodium formamide (HCONHNa), and the mixture was allowed to stand overnight. The product in the flask was taken up with water, the mixture acidified with acetic acid, and then sufficient alcohol added to obtain a clear solution upon boiling. The solution was allowed to cool, the precipitate filtered, and purified by crystallization from hot alcohol. The product obtained, which may be termed "coconut oil acyl formamide", was a white crystalline solid melting at 90° C., and analysis showed it to contain 6.16% nitrogen whereas the calculated nitrogen content of lauryl formamide is 6.17%.

Assuming that coconut oil is largely glyceryl trilaurate, the reaction involved may be represented by the following equation:

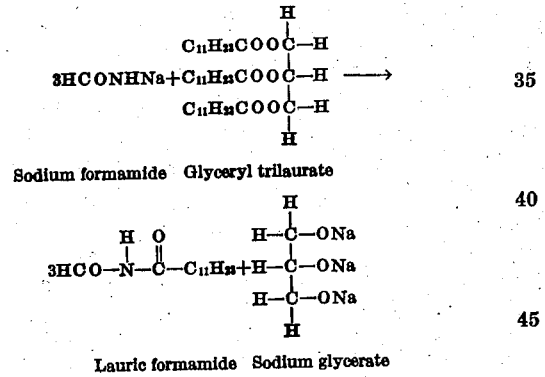

EXAMPLE II

Acyl formamide from linseed oil

To a solution of 60 parts of linseed oil in 20 parts of acetone were added 10 parts of sodium formamide (HCONHNa), and the mixture was allowed to stand overnight. The product in the flask was taken up with water, acidified with acetic acid, and sufficient alcohol added to yield a clear solution upon boiling. The solution was then diluted with acetone, and the precipitate filtered and washed on the filter with acetone. The product was purified by crystallization from alcohol. The purified material, which may be called "linseed oil acyl formamide", melted at 98°–99° C.

The sodium formamide used in Examples I and II, above, was prepared as follows:

To a solution of 45 parts of formamide in about 436 parts of liquid ammonia were added slowly, with stirring, 23 parts of metallic sodium. The mixture was allowed to stand overnight, and the product recovered by evaporation of the ammonia. The product obtained decomposed with effervescence at 150°–155° C.

Example III

Acyl acetamide from coconut oil

To a solution of 32 parts of coconut oil in 20 parts of acetone were added slowly 10 parts of sodium acetamide ($CH_3CONHNa$). The product was allowed to stand overnight, taken up with a small amount of water, acidified with acetic acid, the precipitate filtered and purified by crystallization first from hot acetic acid and then from alcohol. The "coconut oil acyl acetamide" which was obtained melted at 85°–88° C.

The sodium acetamide used in this example was prepared from acetamide, metallic sodium and liquid ammonia by the procedure outlined for the preparation of sodium formamide in Example II.

The following examples illustrate the preparation of acyl ureas by reacting an alkali metal urea with a fatty oil.

Example IV

Acyl urea from coconut oil

A mixture of 300 parts of coconut oil, 160 parts of acetone and 100 parts of sodium urea of the formula $NH_2CONHNa$, prepared by the action of sodium on urea in liquid ammonia according to the process described in my co-pending application Serial No. 15,425 filed April 9, 1935, was stirred vigorously for about five minutes, then 400 parts of additional acetone was added, and stirring continued for one-half hour. The mixture was allowed to stand overnight, water was added, and the solid removed by filtration. This solid product was dispersed in warm alcohol, filtered, and then purified by crystallization from acetic acid. A white crystalline waxy solid melting at 172° C., which may be termed "coconut oil acyl urea", was obtained.

The above product was also synthesized by forming the sodium urea in situ in the presence of the ester, as follows:

A mixture of 60 parts of urea and 13 parts of coconut oil was dissolved in about 930 parts of liquid ammonia, and to this mixture were added slowly 23 parts of metallic sodium. The clear solution was allowed to stand overnight, during which time most of the ammonia evaporated off. Water was then added, the mixture acidified with acetic acid, the precipitate filtered, and the product purified by crystallization from acetic acid, after which it melted at 168°–171° C.

Example V

Acyl urea from linseed oil

Ten (10) parts of sodium urea were added, with stirring, to a mixture of 16 parts of acetone and 59 parts of raw linseed oil, then 4 parts of acetone were added, and the mixture stirred for ten minutes. After standing overnight, the product was taken up with water, acidified with hydrochloric acid, the water decanted from the precipitate, and the product purified by crystallization from hot alcohol. The "linseed oil acyl urea" obtained melted at 154°–158° C. and had an iodine number of 128.

Example VI

Acyl urea from China-wood oil

To a mixture of 12 parts of acetone and 59 parts of China-wood oil were added, with stirring, 10 parts of sodium urea, and the mixture was allowed to stand overnight. The product in the flask was taken up with water, the mixture acidified with hydrochloric acid, filtered, and the precipitate washed with hot alcohol. The "China-wood oil acyl urea" obtained after repeated crystallization from toluene melted at 158°–160° C. and had an iodine number of 108.8. Analysis showed it to contain 8.13% nitrogen, whereas the calculated nitrogen content of eleostearyl urea is 8.97%.

Assuming that China-wood oil is largely glyceryl trieleostearate, the reaction involved may be represented by the following equation:

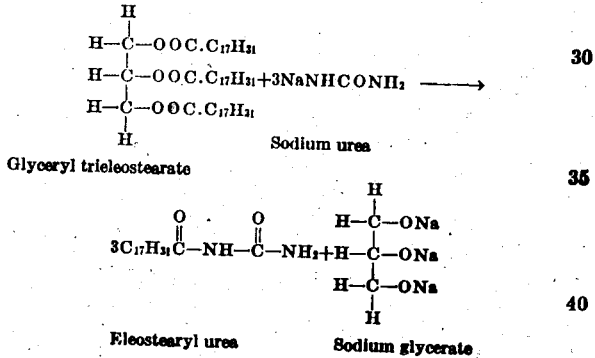

The following example illustrates the synthesis of acyl derivatives of amines.

Example VII

Acyl phenyl hydrazine from coconut oil

To a suspension of 27 parts of phenyl hydrazine in 88 parts of benzene were added, with stirring, 10 parts of sodamide, and the mixture was refluxed for one hour, cooled and 53 parts of coconut oil added slowly. The mixture was then cooled, diluted with water, the oil separated and acidified with hydrochloric acid. The mixture was filtered, and the precipitate purified by crystallization from alcohol. The "coconut oil acyl phenyl hydrazine" obtained was a white solid melting at 75° C., and upon analysis was found to contain 5.71% nitrogen.

In a manner similar to that described in the examples, other higher fatty acyl amides and amines may be prepared from other oils, fats and waxes. As further examples of such oils, fats and waxes may be mentioned alfalfa seed oil, hempseed oil, perilla oil, poppyseed oil, rubberseed oil, sunflowerseed oil, cottonseed oil, kapokseed oil, corn oil, castor oil, teaseed oil, rapeseed oil, pumpkinseed oil, apricot kernel oil, sesame oil, olive oil, palm oil, sperm oil, neetsfoot oil, palm nut oil, cod liver oil, lard oil, menhaden oil, sardine oil, candelilla wax, Chinese vegetable tallow, Japan wax, carnauba wax, spermaceti, wool grease and related substances.

As further examples of alkali metal salts of the amides which may be reacted with any of the fatty oils given above or other fatty oils may be mentioned the alkali metal salts of the amides of nonylic, decanoic, lauric, oleic, ricinoleic, stearic, palmitic, benzoic, phthalic, adipic, sebacic, malonic, glutaric, pimelic, quinolinic, and pyridine carboxylic acids, and homologues thereof. Alkali metal salts of monamides, monoalkali metal salts of polyamides, or polyalkali metal salts of polyamides may be employed. As a particular example of the latter may be mentioned disodium urea (NaHNCONHNa) which may be reacted with any of the oils mentioned above.

Among the alkali metal salts of the amines that may be employed may be mentioned the alkali metal salts of the following primary and secondary amines: butylamine, propylamine, dipropylamine, diphenylamine, naphthylamine, dinaphthylamine, aniline, cyclohexylamine, ethylene diamine, phenylene diamines (o, m and p), glucamine, methyl glucamine, ethanolamine, diethanolamine, piperidine, toluidine (o, m and p), phenetidines, xylidines, and homologues thereof. One preferred class of amino compounds are the alkali metal salts of amines having the following general formula

where R is hydrogen or a hydrocarbon radical such as, for example, alkyl, aryl or a cycloparaffin radical, and R' is a hydrocarbon radical such as, for example, alkyl, aryl or a cycloparaffin group. Another preferred class is the alkali metal salts of hydrazines of which sodium phenyl hydrazine is typical.

As will be apparent from the foregoing examples, the nitrogen compound to be reacted with the fatty oil should have at least one atom of an alkali metal (lithium, sodium, potassium, cesium, etc.) directly attached to amido or aminonitrogen. Thus, the nitrogen compound employed may be a monoalkali metal derivative of a compound containing a single amido or amino group, such as sodium formamide, sodium acetamide, and sodium butylamine, or a monoalkali metal derivative of a polyamine or a polyamide such as, for example, sodium urea; or a polyalkali metal derivative of a polyamine or a polyamide such as, for example, disodium urea.

The nature of the resultant product, as previously indicated, will depend upon the proportions and nature of the reacting ingredients. The reactants are preferably employed in substantially chemically equivalent proportions but, in some cases, the use of an excess of the ester is desirable inasmuch as better yields of the products are to be obtained. The chemically equivalent proportions to produce monoacylated derivatives are three moles of a monoalkali metal amide or amine per mole of the glyceride of the carboxylic acid contained in the fatty oil. In the synthesis of polyacylated amides and amines, it is generally preferable first to form the monoacylated derivatives, then to make the alkali metal salts thereof (for instance, by reaction with metallic sodium in liquid ammonia), and finally to react these alkali metal salts of the monoacylated derivatives with an appropriate additional amount of the naturally occurring ester.

In carrying out the reaction, the use of acetone as the catalyst has given especialy desirable results. As further examples of suitable catalysts may be mentioned saturated aliphatic ketones and monohydric alcohols such as, for example, ethyl alcohol, n-amyl alcohol, tertiary amyl alcohol, the higher alcohols from the methanol synthesis, isopropyl alcohol, n-butyl alcohol, isobutyl alcohol, methyl ethyl ketone, dipropyl ketone, methyl propyl ketone, dibutyl ketone, ethyl propyl ketone and normally liquid homologues thereof. The catalyst may or may not function as a solvent or diluent.

The temperature of the reaction may vary but should preferably be below temperatures at which any of the reactants or products decompose. For example, temperatures within the range of —40° C. when liquid ammonia is used as a reaction medium, up to 75° C. have given good results. The reaction may be effected under atmospheric, subatmospheric or super-atmospheric pressures.

The invention provides a novel process for the synthesis of long chain acyl amides and amines, and especially mixtures thereof, whose acyl radicals are derived from naturally occurring fats, oils and waxes, and have in general a chain length of eight to eighteen carbon atoms. The processes of this invention are particularly valuable in connection with the preparation of the mentioned products since they are obtained in substantially pure form in a simple manner from readily available, inexpensive raw materials. Since a great variety of acylated amides and amines are theoretically possible by application of the sodium amide- or sodium amine-ester reaction to natural oils, fats and waxes, it is evident that products possessing properties for particular needs may be obtained thereby. The mixtures of long chain acyl amides and amines are useful, for example, as wetting and dispersing agents and as intermediates in the synthesis of detergents, wetting and dispersing agents, wax substitutes, moisture-proofing and sizing agents for paper, cloth, and related substances.

The process of the invention offers a simple and direct method for the preparation of long chain acyl derivatives of amides and amines. In working with fatty oils, it has been previously customary to saponify the oil in order to obtain the fatty acid before attempting to convert the latter into any of its derivatives. It has then been necessary, in most cases, to convert the acid to the acid chloride and react the latter with the amine or amide. The present process avoids the difficulties of saponification and other attendant or subsequent processes by enabling the desired acyl derivatives to be prepared in one step by the direct reaction of an alkali metal amide or amine with the naturally occurring esters which are readily available. Furtherfore, insofar as is known, the products of the invention have not been prepared before by any method.

So much of this application as relates broadly to the preparation of acyl ureas from carboxylic acid esters by the reaction of alkali metal ureas therewith is disclosed and claimed in my co-pending application Serial No. 60706 filed of even date herewith.

As many apparently widely different embodiments of this invention may be made without departing from the spirit and scope thereof, it is to be understood that I do not limit myself to the specific embodiments thereof except as defined in the appended claims.

I claim:

1. The process which comprises reacting an ester of a long chain fatty acid with an alkali metal nitrogen compound selected from the class consisting of alkali metal amides and alkali metal amines, in the presence of a catalyst from the class consisting of saturated aliphatic ketones and monohydric alcohols and at a temperature below that at which any of the reactants or products decompose.

2. The process which comprises reacting an ester of a fatty acid having from eight to eighteen carbon atoms with an alkali metal nitrogen compound selected from the class consisting of alkali metal amides and alkali metal amines, in the presence of a catalyst from the class consisting of saturated aliphatic ketones and monohydric alcohols and at a temperature below that at which any of the reactants or products decompose.

3. The process which comprises reacting an ester of a fatty acid having from eight to eighteen carbon atoms with an alkali metal nitrogen compound selected from the class consisting of alkali metal amides and alkali metal amines, in the presence of acetone as a catalyst and at a temperature below that at which any of the reactants or products decompose.

4. The process which comprises reacting an ester of a fatty acid having from eight to eighteen carbon atoms with a carboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

5. The process which comprises reacting a fatty oil with a carboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

6. The process which comprises reacting an ester of a fatty acid having eight to eighteen carbon atoms with a polycarboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

7. The process which comprises reacting a fatty oil with a polycarboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

8. The process which comprises reacting an ester of a fatty acid having eight to eighteen carbon atoms with a monocarboxylic acid amide in which at least one amido-hydrogen atom has been replaced by an alkali metal, in the presence of a catalyst from the class consisting of saturated aliphatic ketones and monohydric alcohols and at a temperature below that at which any of the reactants or products decompose.

9. The process which comprises reacting a fatty oil with a monocarboxylic acid amide in which at least one amido-hydrogen atom has been replaced by an alkali metal, in the presence of a catalyst from the class consisting of saturated aliphatic ketones and monohydric alcohols and at a temperature below that at which any of the reactants or products decompose.

10. The process which comprises reacting a fatty oil with sodium urea, in the presence of a catalyst from the class consisting of saturated aliphatic ketones and monohydric alcohols and at a temperature below that at which any of the reactants or products decompose.

11. The product of the reaction of sodium urea and a fatty oil, in the presence of a catalyst from the class consisting of saturated aliphatic ketones and monohydric alcohols and at a temperature below that at which any of the reactants or products decompose.

12. An acylated amide mixture substantially identical with the product obtainable by reacting a fatty oil with a carboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

13. An acylated amide mixture substantially identical with the product obtainable by reacting a fatty oil with a polycarboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

14. An acylated amide mixture substantially identical with the product obtainable by reacing a fatty oil with a monocarboxylic acid amide in which at least one amido-hydrogen atom has been replaced by an alkali metal, in the presence of a catalyst from the class consisting of saturated aliphatic ketones and monohydric alcohols and at a temperature below that at which any of the reactants or products decompose.

15. An acylated amide mixture substantially identical with the product obtainable by reacting an unsaturated fatty oil with a carboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

16. An acylated amide mixture substantially identical with the product obtainable by reacting an unsaturated fatty oil with a polycarboxylic acid amide in which an amido-hydrogen atom has been replaced by an alkali metal, in the presence of a catalyst from the class consisting of saturated aliphatic ketones and monohydric alcohols and at a temperature below that at which any of the reactants or products decompose.

17. An acylated amide mixture substantially identical with the product obtainable by reacting an unsaturated fatty oil with a monocarboxylic acid amide in which at least one amido-hydrogen atom has been replaced by an alkali metal, in the presence of a catalyst from the class consisting of saturated aliphatic ketones and monohydric alcohols and at a temperature below that at which any of the reactants or products decompose.

18. An acylated amide mixture substantially identical with the product obtainable by reacting an unsaturated fatty oil with sodium urea in the presence of a catalyst from the class consisting of saturated aliphatic ketones and monohydric alcohols and at a temperature below that at which any of the reactants or products decompose.

19. An acylated amide mixture substantially identical with the product obtainable by reacting a drying oil with a carboxylic acid amide in which an amide-hydrogen atom has been replaced by an alkali metal, in the presence of a catalyst from the class consisting of saturated aliphatic ketones and monohydric alcohols and at a temperature below that at which any of the reactants or products decompose.

20. An acylated amide mixture substantially identical with the product obtainable by reacting a drying oil with a polycarboxylic acid amide in which an amide-hydrogen atom has been replaced by an alkali metal, in the presence of a catalyst from the class consisting of saturated aliphatic ketones and monohydric alcohols and at a temperature below that at which any of the reactants or products decompose.

21. An acylated amide mixture substantially identical with the product obtainable by reacting a drying oil with a monocarboxylic acid amide in which at least one amido-hydrogen atom has been replaced by an alkali metal, in the presence of a catalyst from the class consisting of saturated aliphatic ketones and monohydric alcohols and at a temperature below that at which any of the reactants or products decompose.

22. An acylated amide mixture substantially identical with the product obtainable by reacting a drying oil with sodium urea in the presence of a catalyst from the class consisting of saturated aliphatic ketones and monohydric alcohols and at a temperature below that at which any of the reactants or products decompose.

23. An acylated amide mixture substantially identical with the product obtainable by reacting linseed oil with sodium urea in the presence of a catalyst from the class consisting of saturated aliphatic ketones and monohydric alcohols and at a temperature below that at which any of the reactants or products decompose.

RALPH A. JACOBSON.